(12) United States Patent
Brenneman et al.

(10) Patent No.: US 10,705,956 B1
(45) Date of Patent: Jul. 7, 2020

(54) SEQUENCED EXTENSION OPERATIONS ON A DATA STORE

(71) Applicant: Amazon Technologies, Inc., Seattle, WA (US)

(72) Inventors: Kristina Kraemer Brenneman, Renton, WA (US); Norbert Paul Kusters, Redmond, WA (US); Jianhua Fan, Issaquah, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 15/969,604

(22) Filed: May 2, 2018

(51) Int. Cl.
*G06F 12/08* (2016.01)
*G06F 12/0804* (2016.01)
*G06F 9/52* (2006.01)
*G06F 16/23* (2019.01)

(52) U.S. Cl.
CPC .......... *G06F 12/0804* (2013.01); *G06F 9/526* (2013.01); *G06F 16/2372* (2019.01); *G06F 2212/1032* (2013.01)

(58) Field of Classification Search
CPC ............. G06F 12/0804; G06F 12/1441; G06F 16/2308; G06F 16/252; G06F 16/2471; G06F 16/258; G06F 16/2272; G06F 16/951; G06F 16/2372; G06F 16/1767; G06F 16/1865; G06F 9/526; G06F 9/466; G06F 9/46; G06F 2212/1032; G06F 12/16; G06F 11/1662; G06F 16/2379; G06F 9/467; G06F 2212/202

USPC ....................................................... 711/143
See application file for complete search history.

(56) References Cited

U.S. PATENT DOCUMENTS

| 4,682,150 | A | * | 7/1987 | Mathes | G07C 1/10 235/431 |
|---|---|---|---|---|---|
| 9,336,260 | B2 | * | 5/2016 | Srinivasan | G06F 3/0608 |
| 9,361,306 | B1 | * | 6/2016 | Pawar | G06F 16/1865 |
| 9,921,769 | B2 | * | 3/2018 | Aron | G06F 3/0626 |
| 2006/0004865 | A1 | * | 1/2006 | Theurer | G06F 11/3419 |
| 2007/0283111 | A1 | * | 12/2007 | Berkowitz | G06F 3/0601 711/162 |
| 2008/0022059 | A1 | * | 1/2008 | Zimmerer | G06F 11/1662 711/162 |
| 2010/0235335 | A1 | * | 9/2010 | Heman | G06F 16/23 707/703 |
| 2011/0238641 | A1 | * | 9/2011 | Labuda | H04B 17/318 707/703 |
| 2015/0095600 | A1 | * | 4/2015 | Bahnsen | G06F 9/466 711/163 |

(Continued)

*Primary Examiner* — Mano Padmanabhan
*Assistant Examiner* — Jean C Edouard
(74) *Attorney, Agent, or Firm* — Davis Wright Tremaine LLP

(57) ABSTRACT

A data storage system stores information indicating a determined sequence for performing operations on a data store. A lock is acquired on a portion of the data store. It is determined that performing the operations comprises performing at least one additional operation on the data store. Uncommitted changes implied by the operations are stored in a transaction buffer according to the determined sequence. Changes implied by the additional operation are determined based on a reentrant call to a data store interface. The logged sequence of changes is applied to the data store and the lock is released.

20 Claims, 8 Drawing Sheets

(56) References Cited

U.S. PATENT DOCUMENTS

2017/0091327 A1\* 3/2017 Bostic .................. G06F 16/258

\* cited by examiner

SEQUENCED EXTENSION OPERATIONS ON A DATA STORE

BACKGROUND

It has become increasingly common for applications to rely on hosted computing services. For example, hosted computing services are increasingly used to provide relational and non-relational data storage capabilities. Typically, these services are provided by distributed computing systems, in order to provide features such as resilience to data loss, flexible options for increasing or decreasing the amount of available storage, and so on. There are, however, a variety of challenges associated with the provision of such services. These challenges include integrating with other services and applications, supporting the operational environment in which the service is hosted, and maintaining resiliency in the event of system failure.

BRIEF DESCRIPTION OF THE DRAWINGS

Various techniques will be described with reference to the drawings, in which.

DETAILED DESCRIPTION

Figure 1:
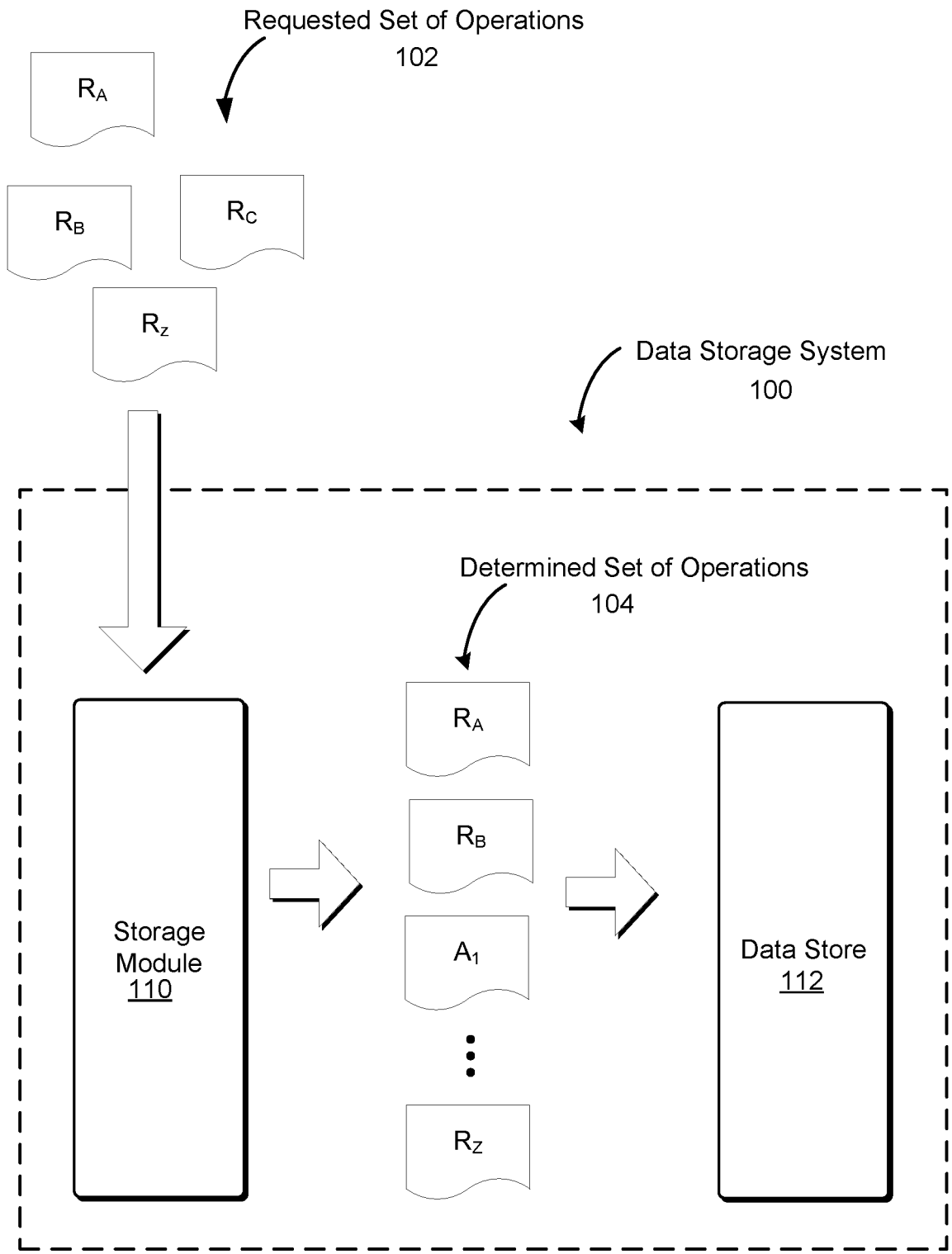
FIG. 1 illustrates an example of a data storage system.

Embodiments of the present disclosure improve the functioning of data storage systems. When a data storage system processes requests to store or retrieve data, the system may process the requests to achieve qualities such as atomicity, consistency, isolation, and/or durability. These aspects of the system's operation may be handled by a subsystem, sometimes referred to as a storage module, which interfaces with the system's storage structures and storage devices. The storage module may serialize interaction with a storage device in order to promote one or more of the qualities of atomicity, consistency, isolation, and durability.

However, there may be circumstances in which requests to store or retrieve data are associated with additional operations. For example, an update made to an index maintained by the data storage system might sometimes trigger further updates to secondary indexes to changes to a repository of metadata. In other circumstances, the data storage system might support extension operations that are not directly supported by the storage module. However, performing the extension operation may still require the storage module to perform operations in addition to those that were explicitly requested. Embodiments disclosed herein provide for atomicity, consistency, isolation, and/or durability of the originally requested operations and the additional operations.

A storage module may perform operations which involve interfacing with the storage structures and devices of the data storage system. Examples of such operations include, but are not limited to, storing and retrieving block-based storage, storing and retrieving key-value data pairs, storing and retrieving files, storing and retrieving structured data, performing insert, update, or delete operations on relational data, and so on. Some of these operations, as well as extension operations, may result in additional operations which may also involve the storage engine. Embodiments of a storage module may provide for reentrancy of requests to perform additional operations. Providing support for reentrancy improves the functioning of the system by enabling the requested and additional operations to be performed in a determined sequence.

Reentrant requests may, in some circumstances, interfere with the atomicity, consistency, isolation, and/or durability of the originally requested operations and the additional operations. For example, interplay between the originally requested operations and the additional operations might result in different end-states of the data maintained by the system, depending upon the order in which the operations were executed. This might occur, for instance, when a sequence of requested operations is replayed on a different system. In such an instance, without support for reentrancy, the data state resulting from the replay might be different than the data state in the original system.

Embodiments disclosed herein provide for the processing of a sequence of operations comprising both originally requested and associated additional operations. A series of requested operations may be durably recorded, along with information identifying an intended sequence for performing the requested operations. Locks may be acquired on data storage structures, and a context record generated. The context record may be provided to reentrant requests to perform operations, or to requests to other modules for handling extension operations. The context record may include information which permits greater access to the underlying transaction than is typical. For example, the context record may include information permitting access to a record of data state changes, sometimes referred to as a transaction buffer. Data state changes may be added to the transaction buffer in an order that preserves the identified sequence of operations.

The sequence preserves the intended order, including the order of any additional operations performed in association with the requested operations. When each operation in the intended sequence has been processed, the logged sequence of data state changes may be applied to the data store, and the acquired locks released.

Embodiments of the present disclosure may be practiced in conjunction with a block-based storage system. A block-based storage system may provide structurally agnostic data storage services to clients via a programming interface. To provide for elastic or adjustable storage capacity, data maintain on behalf of a particular client may be spread over a number of storage nodes. Further, block-based storage systems may replicate data between nodes in order to increase data availability and reduce the possibility of data loss. Client requests to store or retrieve data may trigger additional related operations, such as updates to metadata to indicate where the location of data affected by the requested operation.

Embodiments of the present disclosure may be practiced in conjunction with data backup or data replication. For example, an operation to store data may trigger additional operations which cause the affected data to be copied to another system. The additional operations might also include updating a store of metadata to reflect the locations at which the original and replicated data are stored.

As one skilled in the art will appreciate in light of this disclosure, certain embodiments are capable of achieving certain advantages, including some or of improving consistency in replayed operational sequences, improved integration of operations associated with but not directly supported by a storage module, and so forth.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of a data storage system in which aspects of the various embodiments can be implemented. In this example, a data storage system 100 receives requests to perform a set of operations. The requested set of operations 102 are processed by a storage module 110, which may identify additional operations associated with the requested set 102. The storage module 110 may form a determined set of operations 104 including both the requested set 102 and additional associated operations. The determined set of operations 104 may be applied to a data store 112.

In an embodiment, the data storage system 100 is a distributed computing system comprising a number of computing nodes. Each computing node comprises or is connected to a non-volatile data storage device, examples of which include, but are not limited to, a mechanical disk drive, a solid state drive, a network area storage ("NAS") device, and a storage area network ("SAN"). In an embodiment, the data storage system 100 responds to requests to store data by allocating a portion of available data on one of the storage devices. The capacity of the data storage device to store data may be increased by adding additional storage to the computing nodes, or by adding additional computing nodes with additional storage.

In an embodiment, the storage module 110 comprises an interface to a data store 112. For example, in an embodiment, the storage module 110 maintains a data structure, such as a B-tree, on a non-volatile storage device, on the data store 112. The storage module 110 comprises processor-executable instructions, at least some of which are loaded into memory of a computing device comprising a compatible processor. In response to being executed by the processor, the instructions cause the computing device to perform steps for interfacing with the storage device. For example, the storage module may obtain one or more requests to perform operations on the data store, and process the operations in a manner consistent with the embodiments described herein. Examples include, but are not limited to, the steps described herein with respect to FIG. 6 or 7.

In an embodiment, the data store 112 comprises storage structures, such as B-trees, stored on one or more non-volatile storage devices. For example, with reference to FIG. 3, an embodiment of a data store 112 comprises data structures maintained on persistent storage devices 314a-c. The data structures of the data store 112 contain data stored on behalf of clients of the data storage system. Examples of such data include, but are not limited to, binary files, key-value pairs, and serialized objects.

For convenience of description, the requested set of operations 102 is labelled in FIG. 1 as $R_A \ldots R_Z$. However, in some instances the requests may be received as an unordered set, or as a partially ordered set. For example, consider that requests $R_A$ through $R_C$ might be associated with a first transaction, and requests $R_D$ through $R_F$ with a second transaction. It might be correct to preserve the sequence within each transaction, for example by performing $R_A$ through $R_C$ in order, and likewise performing $R_D$ through $R_F$ in order. However, it may not be necessary to perform $R_A$-C in any particular order with respect to $R_{D-F}$.

In an embodiment, the storage module 110 obtains the requested set of operations 102. The storage module 110 then assigns an intended order of execution to the operations, and durably stores information describing the operations to be executed and the intended order of execution. Embodiments may utilize the durably stored information to ensure that requested operations are processed in a reproducible order, including after a system failure.

The storage module 110 may identify additional operations associated with the requested set of operations 102. In the example of FIG. 1, requests $R_A \ldots R_Z$ in the requested set of operations 102 might be assigned an execution order of $R_A \ldots R_Z$, though as explained above, it could be the case that they are assigned some other order of execution.

In an embodiment, the storage module 110 also identifies additional operations associated with the requested set of operations 102. For example, the storage module 110 might determine that the request $R_B$ is associated with an additional operation $A_1$. This might occur, for example, if the request $R_B$ performs an operation for which corresponding metadata is to be updated by performing operation $A_1$. It might also occur, as a further example, if the request $R_B$ changes data that is to be replicated by performing the additional operation $A_1$.

In an embodiment, the storage module 110 assigns an ordering to additional operations associated with the requested operations 102. In the example of FIG. 1, the requested operation $R_B$ is associated with the additional operation $A_1$. The storage module 110 assigns a sequence to the operations such that the additional operation $R_A$ follows $R_B$ in the sequence of operations. Note that this example is intended to be illustrative of assigning an order, relative to other operations, to additional operations identified by the storage module 110. The order illustrated here should not, therefore, be viewed as requiring the additional operation to immediately follow the requested operation with which it is associated. Rather, embodiments may provide for the order in which an additional operation is performed, relative to other operations, to be consistent and reproducible.

In an embodiment, the determined set of operations 104 is then applied to a data store 112 as an atomic operation. In an embodiment, the determined set of operations 104 is processed according to the determined sequence in a two-phase commit process. In an embodiment, changes to the data store 112 that result from processing the operations are accumulated in a transaction buffer held in transitory memory, and then applied to the data store 112. In an embodiment, the data store 112 is locked during this process.

Figure 2:
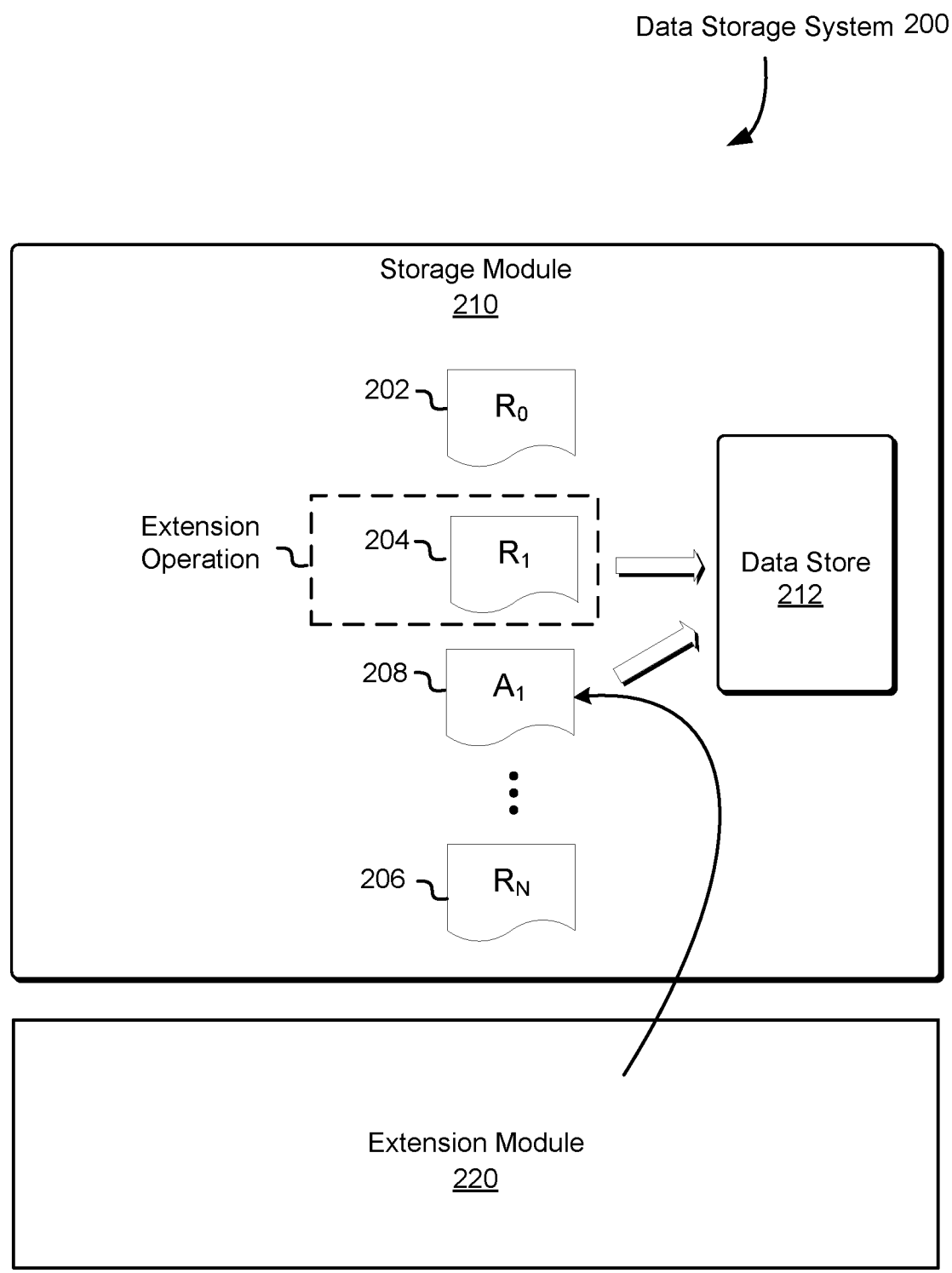
FIG. 2 illustrates an example data storage system in which extension operations are processed.

FIG. 2 illustrates an example data storage system in which extension operations are processed. A data storage system 200 may receive a set of requested operations 202-206. A storage module 210 may receive or otherwise obtain the requested operations 202-206, assign an order $R_0$ to $R_n$ to the operations, and store a record of the operations and their assigned sequence in a data store 212. In an embodiment, the data storage system 200 is a distributed data storage system, such as the example system depicted by FIG. 3. In a further aspect of the embodiment, the data store 212 comprises data structures maintained on non-volatile storage devices by the storage module 210.

In an embodiment, the storage module 210 processes each of the requested operations 202-206 according to the sequence. The storage module 210 might then determine that one of the operations 204 is an extension operation. Here, the term extension operation refers to an operation for which the storage module 210 lacks built-in support. In an embodiment, the storage module 210 examines the operation 204 to determine if the operation 204 is of a type that is directly supported by the storage module 210. If the storage module 210 determines that the operation 204 is not directly supported, it may then select an extension module 220 that is capable of handling operations of that type.

In an embodiment, the storage module 210 selects an extension module 220 for performing the operation according to the following procedure. In response to determining that the operation 204 is not directly supported, the storage module 210 loads a plurality of extension modules, and provides information indicative of the operation 204 to each of the extension modules. In response, the extension modules examine the information and determine whether the operation is of a type that the module supports. If so, the extension module 220 notifies the storage 210 that it is able to perform the operation. The storage module 210 then selects one or more of the modules that responded in the affirmative for performing the operation.

In an embodiment, the storage module 210 comprises processor-executable instructions, at least some of which are loaded into memory of a computing device comprising a compatible processor. In response to being executed by the processor, the instructions cause the computing device to perform steps for interfacing with a storage device of the data store. For example, the storage module may obtain one or more requests to perform operations on the data store, and process the operations in a manner consistent with the embodiments described herein. Examples include, but are not limited to, the steps described herein with respect to FIG. 6 or 7.

In an embodiment, the extension module 220 processes the extension operation 204 by requesting that the additional operation $A_1$ 208 be performed by the storage module 210. In an embodiment, the extension module 220 translates the extension operation 204 into one or more additional operations and sends requests to perform those operations to the storage module.

In an embodiment, the extension module 220 comprises processor-executable instructions for performing an extension operation 204. For example, in an embodiment, the extension module 220 comprises processor-executable instructions, at least some of which are loaded into the memory of a computing device comprising a compatible processor. In response to being executed, the instructions cause the computing device to process the extension operation 204 as described herein. For example, in an embodiment the instructions cause the computing device to translate the requested operation into one or more additional operations to be performed by the storage module 210.

In an embodiment, the extension module 220 performs operations using transaction context information. The transaction context information may, for example, include information permitting the extension module to interact with the ongoing transaction, including the ability to prescribe additional operations on the data store, and to allow those additional operations to be performed according to the determined sequence of operations.

Figure 3:
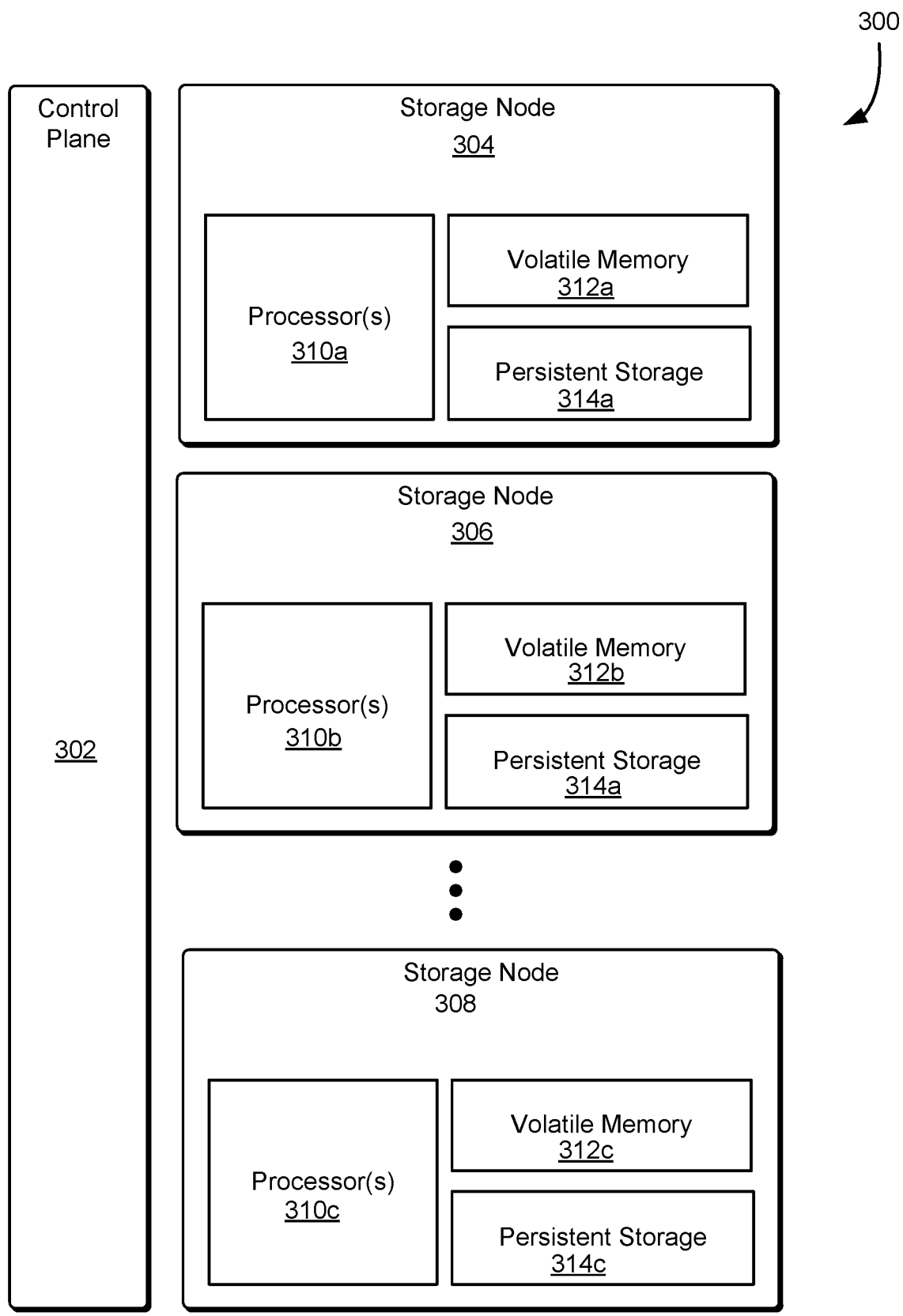
FIG. 3 illustrates an example of a block-based storage system in which aspects of the various embodiments may be practiced.

FIG. 3 illustrates an example of a block-based storage system in which aspects of various embodiments may be practiced. In an embodiment, the data storage system 300 is an aspect of a data storage service that provides block-based storage capabilities to customers over a network. A data storage system 300 may comprise storage nodes 306-308. In an embodiment, the data storage system 100 of FIG. 1 may correspond to the data storage system 300. Likewise, the data storage system 200 illustrated in FIG. 2 may correspond to the data storage system 300. Requests to provide data storage services may be routed through the control plane 302 to one or more of the storage nodes 306-308. Each of the storage nodes 306-608 may store blocks of data in a persistent storage 314, as directed by a control plane 302.

In an embodiment, each of the storage nodes 304-306 may comprise one or more processors 310, a volatile memory 312, and a persistent storage 314. Each of the storage nodes 304-306 may store data in the persistent storage 314 on behalf of clients of a data storage service. Each client may be allocated units of space, sometimes referred to as blocks, which are stored in the persistent storage. The amount of space allocated to a client on a given storage node 304-306, and the number of nodes which maintain data on behalf of the client, may be scaled up or down according to the client's needs.

The storage nodes 304-306 may process requests to store and retrieve data on behalf of a client. For example, a selected storage node 304 may receive requests to perform data storage and retrieval operations. In an embodiment, the control plane 302 receives a request to perform a data storage and retrieval operation, selects a storage node 304 for processing the request, and forwards the request to the selected storage node 304. The selected storage node 304 may then process the request.

In an embodiment, the requests to store and retrieve data correspond to or comprise block-level operations. Block-level operations are operations on units of storage space that may be treated as a storage volume. For example, a block-level operation may allocate a unit of storage space that may then be subsequently formatted to support a file system, such as NTFS, FAT, APFS, VMFS, and so on. In further aspects, requests may be provided via a block-level protocol such as Small Computer System Interface ("SCSI"), Internet Small Computer System Interface ("iSCSI"), Fibre Channel over Ethernet ("FCoE"), and so on.

In an embodiment, the storage node 304 processes the request by assigning an order of processing to a requested operation, durably storing a record of an intent to perform the requested operation, including information identifying an intended order of performing the requested operation, identifying associated additional operations, and performing both the requested and additional operations according to a determined order.

In an embodiment, performing the requested and additional operations involves a two-phase commit process. During the first phase, each operation in the sequence of requested and additional operations is partially processed. In an embodiment, records of changes to stored data resulting from processing the operation are appended to a log kept in volatile memory 312. When the requests have been processed, changes recorded in the log are read from volatile memory 312 are then applied to data kept in persistent storage 314.

Figure 4:
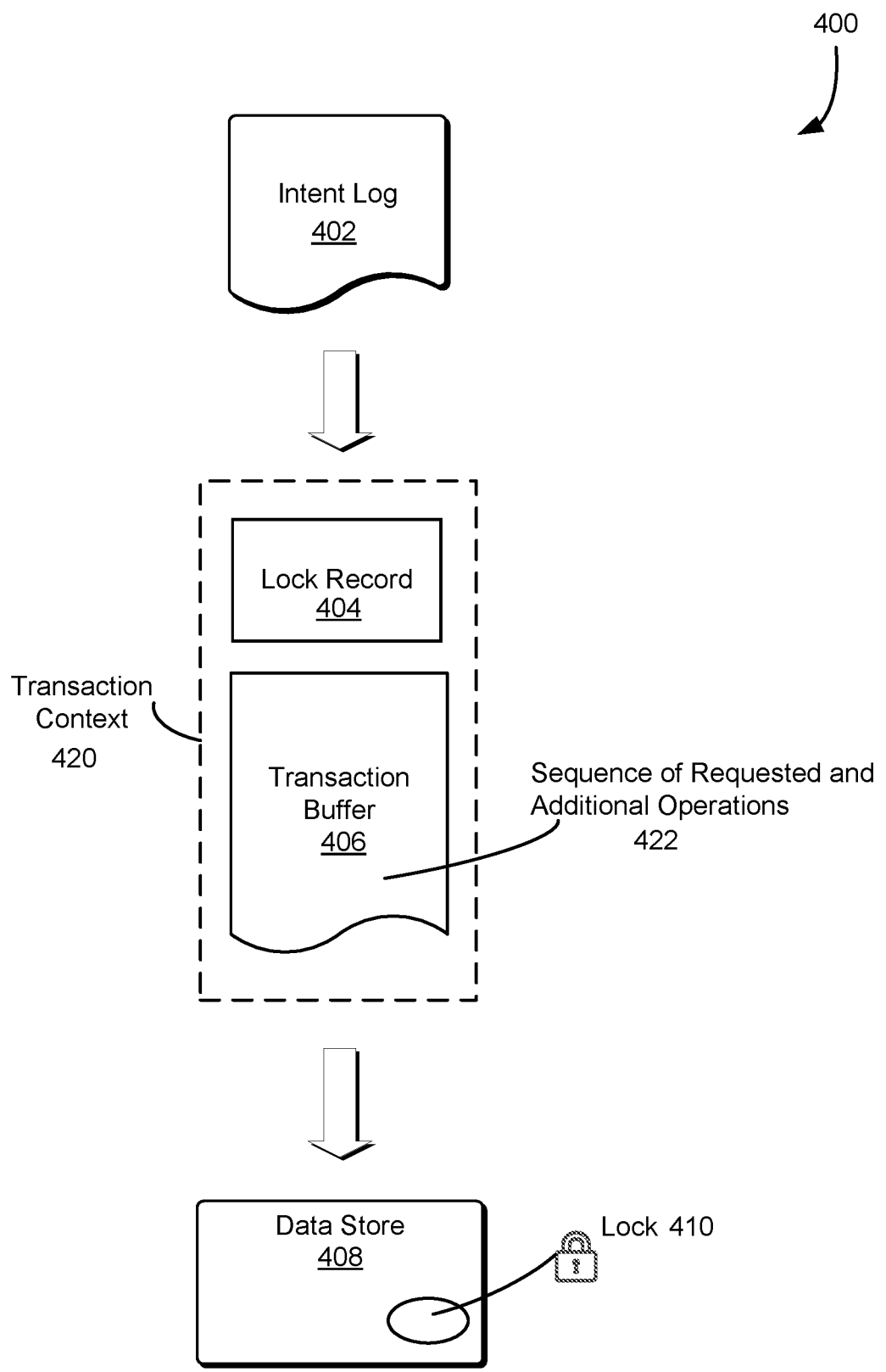
FIG. 4 depicts an example of processing a transaction comprising requested and additional operations.

FIG. 4 depicts an example of processing a transaction comprising requested and additional operations. In an embodiment, a computing device performing the example procedure 400 processes a set of received operations. In this example embodiment, the set of received operations, and associated additional operations, are processed atomically, such that either all state changes resulting from the processing are applied, or none are. Further, the set of received operations, and associated additional operations, are processed so that the operations may be replayed elsewhere, or used to restore data in the event of a failure. This capability is provided in part due to the preservation of the intended sequencing of the requested and additional operations, even when preserving the order requires reentrancy into a storage module, or when the additional operation is performed on or involves components other than the storage module or the data store on which the storage module operates. In the latter case, an additional operation might involve another system, an alternate data store, and so on. These operations may be subsequently replayed in the same sequence.

For example, although the set of requested operations may be received in any order, a computing device performing the example procedure 400 assigns an intended sequence of performing the requested operations, and further ensures that any associated operations are also performed in the same sequence. The intended order is maintained in cases where, in order to perform the operation in the intended sequence, the storage module is made to process requests in a reentrant or recursive fashion, and where the associated involves other components or data stores.

In an embodiment, the example procedure 400 is performed on a data storage system, such as the data storage system 100 depicted in FIG. 1. The example procedure 400 may be preceded by the data storage system 100 receiving a series of requests to perform operations. The data storage system 100 may, for example, receive a series of requests to store or update data stored on the data storage system 100. The requests may be received from a single client, or from multiple clients.

In an embodiment, the data storage system 100 stores a record of the requested operations in an intent log 402. Entries in the intent log 402 may be durably recorded, so that the contents of the intent log 402 can be reliably recovered in the event of system failure. Any of a variety of techniques may be employed to stored record the contents of the intent log. For example, in an embodiment, the intent log 402 is stored in a persistent memory, e.g. a non-volatile memory, whose contents are preserved in the event of failure.

In an embodiment, the data stored in the intent log includes information indicating an order in which the requested operations should be performed. As noted earlier, requests to perform the operations may not necessarily be received in the same order they are to be performed. This situation might arise in a variety of circumstances. These may include circumstances related to the management of a distributed block storage system, such as the system depicted in FIG. 3. For example, certain operations might involve adding new storage nodes, moving data between storage nodes, updating metadata to refer to a location where data is stored, and so forth. In an embodiment, the data storage system determines a preferred sequence for performing the operations, based on various factors such as efficiency, storage availability, fault tolerance, and so forth.

In an embodiment, information indicative of the requested operations is stored in the intent log 402, but information indicative of associated additional operations are not recorded. In a further aspect of this embodiment, the associated additional operations are not determinable at the time the data is recorded in the intent log 402. In some embodiments, additional operations are included in the intent log 402 unless they are not determinable at the time the information is recorded. However, in embodiments, the additional operations excluded from the intent log are still performed in accordance with the intended sequence, so that the sequence of requested and additional operations are reproducible and/or replayable.

In an embodiment, the example procedure 400 further comprises forming a transaction context 420 to represent state information associated with the transaction in which the operations recorded in the intent log 402, and associated additional operations, will be performed. The state represented by the transaction context 420 may include a lock record 404 and a transaction buffer 406. Note that herein, a transaction refers to a context for processing a series of operations stored in the intent log 402. For example, a transaction might be initiated upon determining to process a series of operations stored in the intent log 402. The transaction might then be committed when the operations have been processed, or rolled back if processing the operations fails.

In an embodiment, the transaction buffer 406 stores a record of data state changes that results from processing the operations noted in the intent log 402 and from the processing of any additional associated operations. For example, if an operation updates a block of data identified as $B_1$ to contain data $D_2$, and entry in the transaction buffer might be recorded as "$B_1 \Rightarrow D_2$." Similarly, if the operation ""$B_1 \Rightarrow D_2$" triggered an additional operation moving block $B_1$ from storage node $S_1$ to storage node $S_2$, and entry in the transaction buffer might be recorded as "$\{B_1@S_1 \Rightarrow S_2\}$. It will be appreciated that these examples are intended to be illustrative, and should therefore not be construed in a manner which would limit the scope of the present embodiment to only those examples provided.

In an embodiment, the transaction buffer 406 is kept in transitory memory, e.g. volatile memory, prior to the transaction being committed. The operations in the intent log 402, and any associated additional operations, may be processed in sequence and the resulting changes recorded in the transaction buffer 406. During this time, access to the data store 408 may be locked.

In an embodiment, the lock record 404 corresponds to a lock 410 on a portion of the data store 408. The lock 410 may, for example, represent one or more concurrency control mechanisms that are used to control read or write access to the locked portion of the data store 408. In an aspect of this embodiment, a region of the data store 408 is locked while operations noted in the intent log 402 are processed. The locked region may encompass data that is or might be affected by processing of the operations. In some cases, the locked region may encompass the entire data store 408. In other cases, the locked region may encompass storage blocks associated with the noted operations.

In an embodiment, the transaction context 420 is shared between a storage module and an extension module in order to facilitate in-sequence processing of requested and additional operations. For example, a storage module might determine that a requested operation is of an unknown type, and forward the request to an extension module determined to be capable of processing the requested operation. In an embodiment, the extension module, upon obtaining the request, might then use the transaction context 420 to append data state changes to the transaction buffer 406. In another embodiment, the extension module might translate the request into additional requests of a type that are known to the storage module. In such cases, the extension module might forward the transaction context 420 to the storage module in a reentrant call. By having access to the transaction context 420, the storage module is able to maintain proper sequencing of the additional operations.

In an embodiment, the example procedure 400 further comprises applying changes stored in the transaction buffer 406 to the data store 408. For example, the changes indicated by the transaction buffer 406 may be applied in sequence to the corresponding portions of the data store. Access to the affected portions may be controlled by the lock 410. In an embodiment, no other system is permitted to write to the locked region while the transaction is in progress. Once the changes recorded in the transaction buffer 406 have been applied to the data store 408, the transaction is committed and the lock 410 may be released.

In an embodiment, the data store 408 is stored on a non-transitory medium, such as a mechanical disk drive, solid-state driver, and so forth. In an embodiment, the data store 408 is maintained in a data structure, such as a B-tree, maintained on a non-transitory medium.

Figure 5:
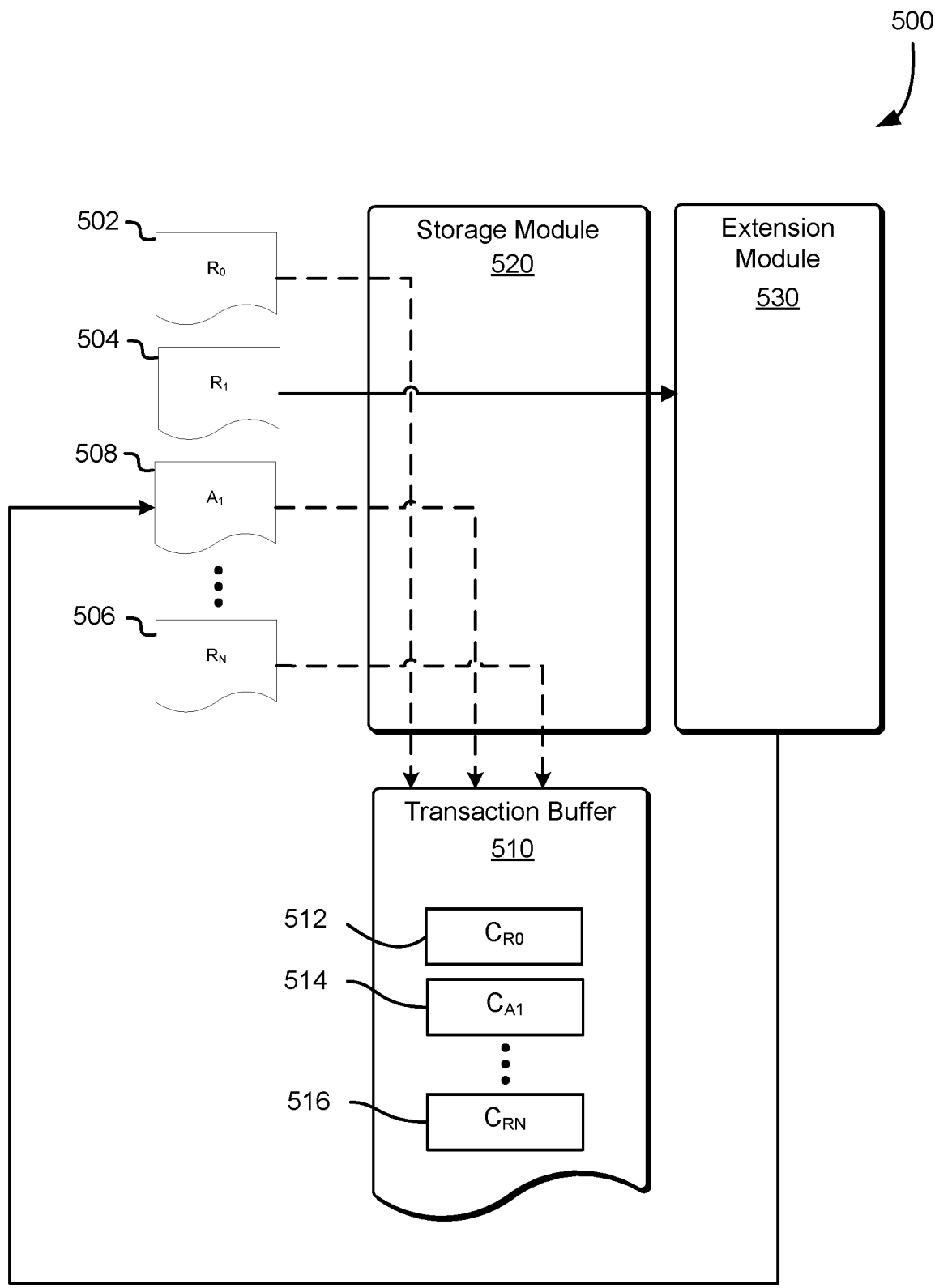
FIG. 5 depicts an example embodiment of a storage module and an extension module.

FIG. 5 depicts an example embodiment of a storage module and an extension module. A data storage system 500 may comprise a storage module 520 that processes a sequence of requested operations 502-506 in which one of the operations 504 is an extension operation. The extension operation 504 may, for example, be an operation type not directly associated with, or supported by, the storage module 520. Examples of extension operations include updates to metadata, backup operations, storage capacity readjustments, and so forth. It will be appreciated that these examples are intended to be illustrative, and should therefore not be construed so as to limit the scope of the present disclosure to these examples.

In an embodiment, the storage module 520 processes a series of requested operations 502-506 in a determined order. The storage module 520 may examine each of the operations 502-504 and determine a corresponding type of the operation. For example, the storage module 520 might determine whether an operation is an insert, update, or delete operation. The storage module 520 may, however, determine that one of the operations 504 is a type of operation not directly supported by the storage module. In order to process the operation 504, the storage module 520 may then identify an extension module 530 that is determined to be capable of at least partially processing the operation 504.

In an embodiment, the storage module 520 sends a request to perform the extension operation 504 to the extension module 530. In an embodiment, the request to perform the extension operation comprises information indicative of the context of the transaction, including information sufficient to enable reentrancy from the extension module 530 to the storage module 520.

In an embodiment, the extension module 530 processes the extension operation 504. The processing performed by the extension module 530 may include various types of operations, including but not limited to performing backup operations, updating metadata, and so on. In some cases, embodiments may determine that processing the extension operation 504 comprises performing an additional operation 508 via storage module 520. The extension module 530 may request that the storage module 520 perform the additional operation 508. In an embodiment, the extension module 530 receives transaction context information sufficient to enable reentrancy into the storage module 520. In a further aspect of the embodiment, the enabled reentrancy permits the storage module 520 to maintain the intended sequence of performing the requested and additional operations 502-508.

For example, using the transaction context information the storage module 520 is able to maintain the order of the additional operation 508 with respect to the requested operations 502-506. In the example of FIG. 5, the additional operation 508 is in its assigned order after the extension operation 504.

In an embodiment, the order of operations is maintained in a transaction buffer 510, which may also be described as an ordered buffer. The storage module 520 examines the operations 502-508 and appends, for each operation, and entry 512-516 to the transaction buffer. In an embodiment, the entries 512-516 are appended to the log in an order corresponding to their defined sequence. In an embodiment, the entries describe a corresponding change to a data state, such as information describing an addition or change to data maintained by the data storage system 500.

Figure 6:
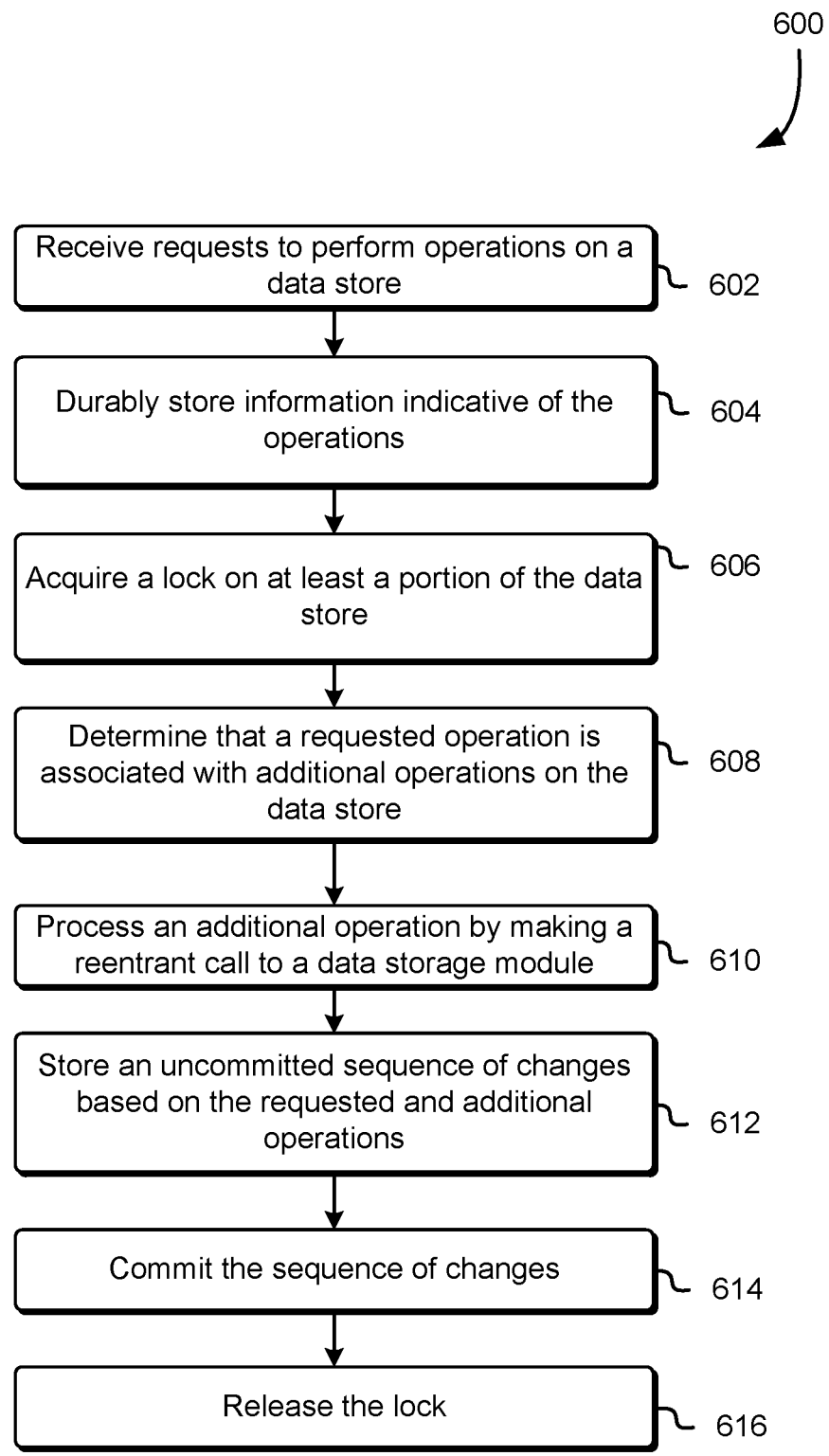
FIG. 6 depicts an example process in which a data storage system performs requested and additional operations.

FIG. 6 depicts an example process in which a data storage system performs requested and additional operations. In an embodiment, an example process 600 may comprise steps for processing requested and additional operations, such that an intended order of operations is maintained. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

At element 602, a data storage system receives or otherwise obtains requests to perform operations on a data store. A request may, for example, comprise instructions to perform a data storage operation, a data retrieval operation, and so forth. In an embodiment, a request comprises instructions to store or retrieve data on a data storage system, such as the block-based storage system depicted in FIG. 3. In another embodiment, a request comprises instructions to store or retrieve data in a database, such as a relational database or a "NoSQL" database.

In an embodiment, the data storage system receives or otherwise obtains a series of requests from one or more client devices. For example, in an embodiment the requests are provided to the data storage system by way of a web-based application programming interface ("API"). Examples include, but are not limited to, "put" interfaces to store data and "get" interfaces to retrieve data. In another embodiment, the requests are provided to the data storage system via a wire protocol or call-level interface.

At element 604, the data storage system durably stores information indicative of the requested operations. In an embodiment, the data storage system stores information sufficient to subsequently perform the operation. In an embodiment, the data storage system stores the information in an intent log, transaction buffer, or similar structure.

In an embodiment, the data storage system durably stores the information indicative of the requested operations. For example, in an embodiment the data storage system maintains an intent log or transaction buffer on a non-transitory storage medium, such as a hard disk drive. Here, durably storing data refers to storing data so that it may be recovered in the event of certain system failures.

In an embodiment, the durably stored information includes an intended order of performing the operations. Here, the intended order refers to an order determined by the system based on various factors. For example, in an embodiment the data storage system may determine an order to perform the requested operations, and store, in an intent log, information which is descriptive of the intended order. In this way, once the intended order is determined, it is durably stored and may be recovered in the event of system failure.

In an embodiment, the intended order of operations is determined based on the order in which the corresponding requests to perform the operations was received. For example, in an embodiment, the intended sequence of an operation, relative to other operations, corresponds to a timestamp associated with the request to perform the operation. However, embodiments may determine the intended order in view of other factors. Additional factors may include additional operations associated with the requested operations, the types of requested and additional operations, the client(s) associated with the requested an additional operations, optimization factors, and other considerations.

At element 606, the data storage system may acquire a lock on at least a portion of the data store. A lock may include software and/or hardware-based mechanisms for controlling access to the locked portion. For example, in an embodiment the data store system stores data in a tree data structure, such as a B-tree. The lock may prevent at least write access to some branch of the tree, potentially including the entire tree. In an embodiment, the lock encompasses data that would be affected by performing the requested or additional operations.

At element 608, the data storage system determines that one or more of the requested operations are associated with additional operations on a data store. In an embodiment, the data storage system determines that performing one or more of the requested operations will involve performing at least one additional operation. For example, in an embodiment the data storage system may determine that performing an operation requires updates to metadata. The operation may, for example, require an update to metadata corresponding to the data that is modified by the operation. In an embodiment, the data storage system may determine that some ancillary operation, such as relocating a data blocks between storage nodes, is to be performed.

In an embodiment, the data storage system determines an order of performing the additional operations, relative to the intended sequence of performing the requested operations. The data storage system may also durably store information indicative of the intended order. In an embodiment, this information is stored with and at the same time as information indicating the intended order of performing the requested operations. In another embodiment, the information is stored in separately or in different step other than the depicted element 604.

At element 610, the data storage system processes an additional operation by making a reentrant call to a data storage module. In an embodiment, the reentrant call may be made with a parameter comprising information usable to access a portion of the data store locked for the pending transaction. The call may also be made with a parameter comprising information usable to append data indicative of potential changes to a transaction buffer.

In an embodiment, the reentrant call permits a data storage module to process the additional operation in an order that corresponds to the intended sequence of requested and additional operations. In conventional approaches, requests to a storage module might be serialized and processed in the order they are received, rather than in an intended order. In an example embodiment, additional operations which might otherwise be processed after any other pending operations may instead be processed in accordance with the intended sequence. For example, if a requested operation is determined to require an additional operation, the additional operation may be processed by the storage module immediately after the requested operation, rather than after any other unrelated pending operations.

At element 612, the data storage system stores an uncommitted sequence of changes based on the requested and additional operations. In an embodiment, the data storage system processes each of the requested and additional operations and determines what data, configuration, or other changes are to be made based on the requested and additional operations. The data storage system may store records of these potential changes in a transaction buffer. In an embodiment, the records are stored in a sequence corresponding to the intended order of performing the operations. In an embodiment, the transaction buffer is maintained in transitory memory, such as in volatile random-access memory.

At element 614, the data storage system commits the sequence of changes to the data store. In an embodiment, the data storage system applies uncommitted changes in the order the changes are recorded in the transaction buffer. For example, in an embodiment the data storage system processes each record in the transaction buffer by applying changes described in the records to the data store. As indicative above, a lock is held over the affected portions of the data store until all of the changes have been applied.

At element 616, the data storage system releases the lock. In an embodiment, the lock is released either in response to successful application of the sequence of changes stored in the transaction, or in response to a failure condition. In the former case, the sequence of requested and additional operations may be considered to have been fully processed and committed. In the latter case, the sequence may be considered to have been uncommitted. Embodiments may process a sequence of requested and additional operations as an atomic operation, so that either the entire sequence is successfully committed, or none of the corresponding changes are committed.

Figure 7:
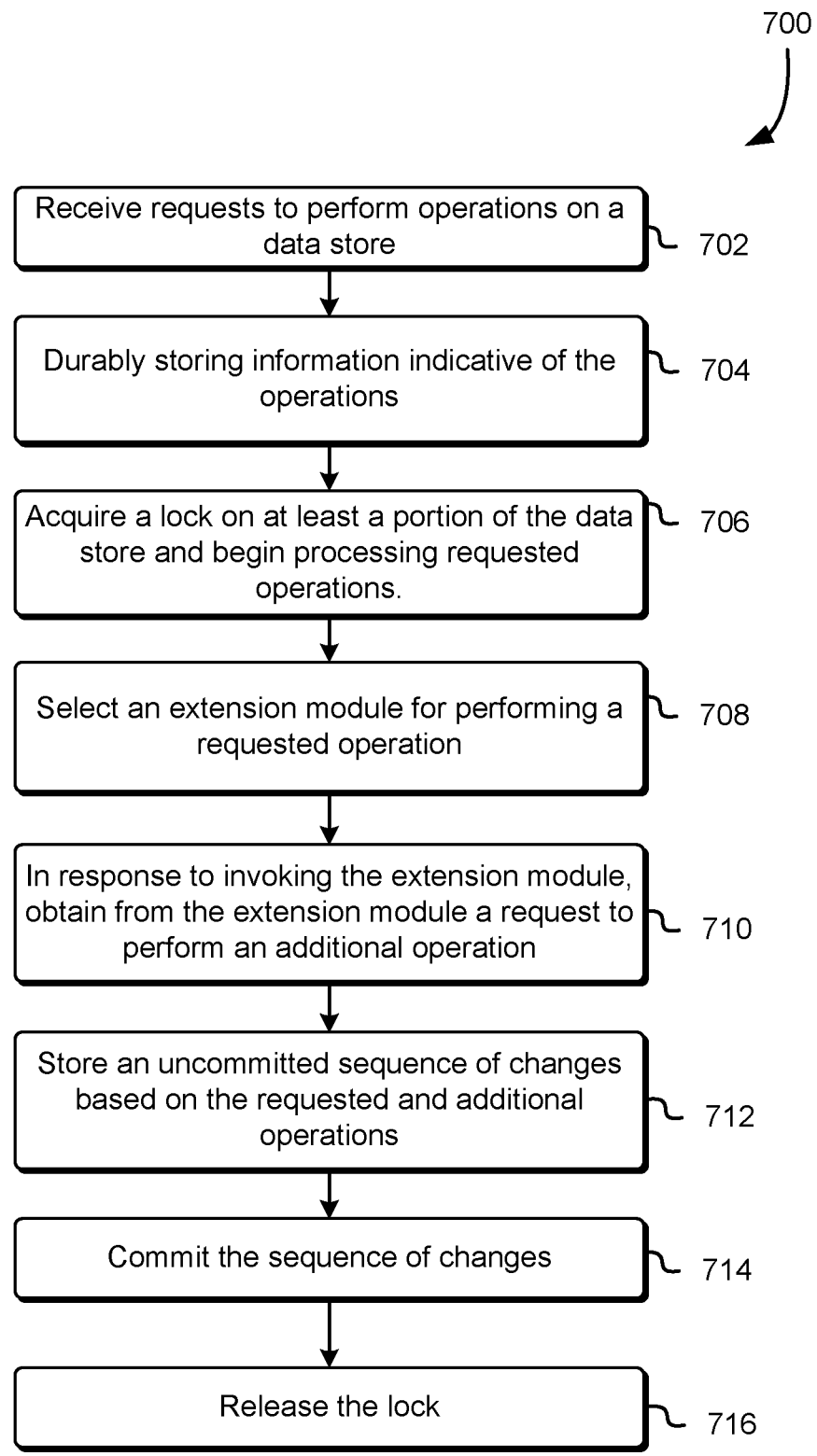
FIG. 7 depicts an example process in which a data storage system performs an extension operation.

FIG. 7 depicts an example process in which a data storage system performs an extension operation. In an embodiment, an example process 700 may comprise steps for processing an operation of a type not directly supported by a storage module of a data storage system. Although FIG. 7 is depicted as a sequence of elements, the depicted sequence should not be construed as limiting the scope of the present disclosure to only those embodiments conforming to the depicted order. For example, unless otherwise indicated, the depicted steps may be reordered or performed in parallel.

At element 702, a storage module receives or otherwise obtains requests to perform operations on a data store, and at step 704, the storage module may durably store information indicative of the requested operations. In an embodiment, the storage module also stores information indicative of an intended order of performing the requested operations.

At element 706, the storage module acquires a lock on at least a portion of the data store and begin processing the requested operations. The storage module may initiate the lock in response to a determination to process one or more of the received requests, and subsequently release the lock, as depicted by step 716, when the requests have been processed.

At element 708, the storage module selects an extension module for performing a requested operation. In an embodiment, the storage module determines that a requested operation is of a type that is not directly supported by the storage module, and locates another module, which may be referred to as an extension module, to support it. The storage module may, in an example embodiment, locate the module by analyzing the requested operation and mapping it via a registry or similar component to a module that is identified as supporting the extension operation.

In an embodiment, the storage module invokes a function of the extension module to perform the requested operation. In a further aspect, the function is invoked with context information sufficient to permit reentrancy into the storage module. In an embodiment, the function is invoked with a transaction context record which includes a handle to the lock. In another embodiment, the information also includes a handle to a log of the transaction.

At element 710, the storage module may receive, from the module, a request to perform an additional operation. In an embodiment, an extension operation is translated into one or more additional operations to be performed by the storage module on the data store. For example, in an embodiment a backup operation may be supported by an extension module. The extension module might translate the backup operation into one or more "put" operations to be performed by the storage module on a data store. The request received by the storage module, from the extension module, may include the information sufficient to enable the reentrancy into the stack of the storage module. In an embodiment, the storage module is able to use this information to process the extension operation in the same transactional context. For example, the additional operations resulting from the extension operation may be recorded in the same transaction buffer as the operations that precede and follow the extension operation. Moreover, in a further aspect the order in which the operations are recorded in the transaction buffer is also controlled. Accordingly, embodiments are able to replay the requested and original operations at a later time, or on a different system, such that the requested and additional are performed in the same order each time.

At element 712, the storage module stores an uncommitted sequence of changes based on the requested and additional operations. In an embodiment, the storage module processes the records of uncommitted operations and applies each corresponding change to the data store. In an embodiment, the extension module is also invoked at this stage to finalize (i.e., commit) aspect of an extension operation that are not handled by the storage module. Then, at step 714, the storage module commits the sequence of changes to the data store and releases the lock, as depicted by step 716.

Figure 8:
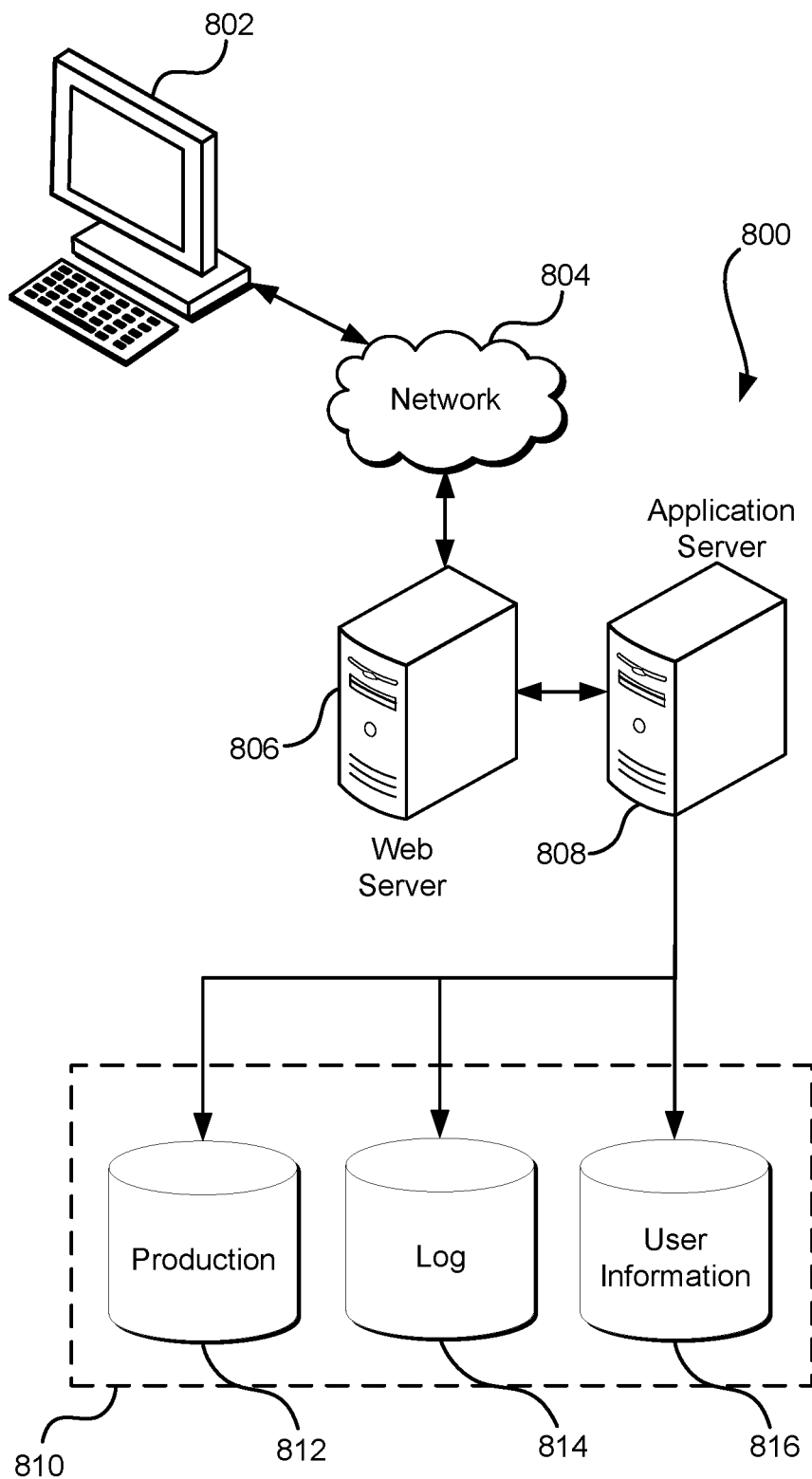
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the web server 806 and application server 808 provide an interface to a data storage service, such as the data storage service implemented by the systems of FIG. 3. For example, the client device 802 may interact with the web server 806 and/or application server 808 to obtain data storage and retrieval services.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Unless otherwise indicated or clear from context, the phrase "based on" is intended to mean "based at least in part on" and not "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory that stores processor-executable instructions that, in response to being executed by the at least one processor, cause the system to at least:
      obtain one or more requests to perform a plurality operations on a data store;
      store information indicative of a sequence for performing the plurality of operations;
      acquire a lock on a portion of the data store;
      determine that a first operation, of the plurality of operations, is associated with an additional operation on the data store;
      append, to an ordered buffer maintained in a volatile memory, changes indicated by the first operation and the additional operation, wherein the changes are appended to the ordered buffer in accordance with the sequence, and wherein at least one change associated with the additional operation is determined based at least in part on a reentrant call to a data store interface;
      apply the changes appended to the ordered buffer to the data store; and
      release the lock.

2. The system of claim 1, wherein the additional operation updates metadata referring to a location of data modified by one or more of the plurality of operations.

3. The system of claim 1, wherein the processor-executable instructions, in response to being executed by the at least one processor, further cause the system to at least:
   determine that a first operation of the plurality of operations corresponds to an extension operation;
   provide a request to perform the first operation to a module selected for performing the first operation; and
   receive a request to perform the additional operation from the module.

4. The system of claim 1, wherein the reentrant call is made with transaction context information comprising information usable to access the locked portion of the data store.

5. A computer-implemented method, comprising:
   storing information indicative of a sequence for performing a first operation of a plurality of operations on a data store;
   acquiring a lock on at least a portion of the data store;

determining that performing the first operation comprises performing an additional operation on the data store;

storing, in an order in accordance with the sequence, data indicative of uncommitted changes to the data store, wherein the uncommitted changes are based on the first and additional operations, and wherein the uncommitted changes based on the additional operation are determined based at least in part on a reentrant call to a data store interface; and committing changes to the data store made while the at least a portion of the data store was locked.

6. The computer-implemented method of claim 5, further comprising:

determining that the first operation is associated with a second additional operation, the second additional operation not on the data store; and replaying the plurality of operations, wherein the first operation, additional operation, and second additional operation are replayed in accordance with the sequence.

7. The computer-implemented method of claim 6, wherein the metadata comprises information indicative of a storage location in a block-based storage system.

8. The computer-implemented method of claim 5, further comprising:

determining that a module comprises a function capable of performing the first operation;

calling the function; and receiving, from the module, a request to perform the additional operation.

9. The computer-implemented method of claim 8, further comprising providing, in the call to the function, a transaction context record comprising information indicative of the lock.

10. The computer-implemented method of claim 8, wherein the function determines that performing the first operation comprises storing key-value data in the data store.

11. The computer-implemented method of claim 5, wherein the additional operation is a backup operation for data affected by the changes.

12. The computer-implemented method of claim 5, further comprising replaying the plurality of operations, wherein the first and additional operations are replayed in accordance with the sequence.

13. The computer-implemented method of claim 5, further comprising transferring information indicative of uncommitted changes to persistent storage in response to information indicative of the lock being released.

14. The computer-implemented method of claim 5, further comprising:

receiving, by a first module, one or more requests to perform the plurality of operations, wherein the first module is to update the data store;

select a second module to perform the first operation of the plurality of operations, the second module not to update the data store;

providing, to the second module, a request to perform the first operation, the request comprising information indicative of the lock; and receiving, from a second module not to update the data store, a request to perform the additional operation.

15. A non-transitory computer-readable storage medium having stored thereon executable instructions that, as a result of being executed by one or more processors of a computer system, cause the computer system to at least:

store information indicative of a sequence for performing a first operation of a plurality of operations on a data store;

form a record indicative of a pending transaction;

determine that performing the first operation comprises performing an additional operation on the data store;

perform the first and additional operations in accordance with the sequence for performing the first operation, wherein changes to the data store based on the first and additional operations are initially uncommitted, and wherein changes to the data store based on the additional operation are determined based on a reentrant call comprising the record indicative of the pending transaction as a parameter; and commit changes to the data store made during the pending transaction.

16. The non-transitory computer-readable storage medium of claim 15, wherein the instructions further comprise instructions that, as a result of being executed by the one or more processors, cause the computer system to:

provide, to each of a plurality of modules, information indicative of the first operation;

receive, from one of the plurality of modules, information indicative of the one of the plurality of modules being capable of performing the first operation;

provide the one of the plurality of modules with a request to perform the first operation, the request comprising the record indicative of the pending transaction; and receive, from the one of the plurality of modules, the reentrant call, the reentrant call indicative of a request to perform the additional operation.

17. The non-transitory computer-readable storage medium of claim 15, wherein the additional operation updates metadata referring to a location of data modified by one or more of the plurality of operations.

18. The non-transitory computer-readable storage medium of claim 15, wherein performing the first and additional operations comprises appending changes indicated by the first and additional operations to a log stored in volatile memory, the changes appended in accordance with the sequence.

19. The non-transitory computer-readable storage medium of claim 15, wherein the record indicative of the pending transaction comprises usable to access a locked portion of the data store.

20. The non-transitory computer-readable storage medium of claim 15, wherein the reentrant call is processed by an interface to the data store.

* * * * *